United States Patent Office 3,423,327
Patented Jan. 21, 1969

3,423,327
ORGANIC COMPOSITIONS STABILIZED AGAINST OXIDATION BY MEANS OF AMINOBENZYL THIOETHERS
David J. Tracy, Phillipsburg, N.J., assignor to GAF Corporation, a corporation of Delaware
No Drawing. Filed Feb. 23, 1967, Ser. No. 617,790
U.S. Cl. 252—402                 6 Claims
Int. Cl. C09k 3/00; B01j 1/16; C07c 87/62

ABSTRACT OF THE DISCLOSURE

Organic compositions which tend to deteriorate by absorption of oxygen from the air are stabilized by incorporating into said compositions an antioxidizing amount of an aminobenzyl thioether.

---

It has been found that a certain class of aminobenzyl thioethers which, when present in low concentrations, have the characteristic property of retarding the premature oxidation of organic compositions that tend to deteriorate by the absorption of oxygen from the air.

The prior art is replete with various methods of preparing organic thioether compounds, as may be noted from J. Am. Chem. Soc. 80, 162, 1958; J. Org. Chem., 24, 1035, 1959; J. Org. Chem. 28, 2763, 1963; J. Am. Chem. Soc. 76, 3969, 1954, and J. Org. Chem. 30, 28, 1965. None of these references, however, discloses or suggests the use of aminobenzyl thioethers as antioxidants for organic compositions which tend to deteriorate by the absorption of oxygen from the air.

The principal object of the present invention is accomplished by incorporating into any organic substance which tends to deteriorate by the absorption of oxygen from the air, a small quantity of an aminobenzyl thioether having the following formulae:

(1)
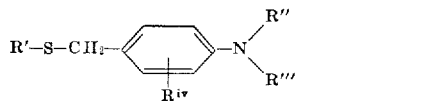

(2)
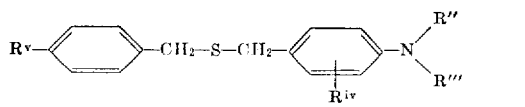

(3)
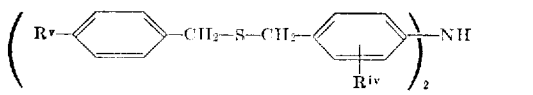

wherein R' is a member selected from the class consisting of an alkyl group of from 1 to 22 carbon atoms, e.g., methyl, ethyl, butyl, octyl, decyl, undecyl, dodecyl, tridecyl, tetradecyl, pentadecyl, hexadecyl, octadecyl and behenyl; a phenyl group or a phenyl group substituted by an alkyl group of from 1 to 22 carbon atoms, R'' and R''' are either hydrogen or an alkyl group of from 1 to 20 carbon atoms, $R^{iv}$ is either hydrogen, alkyl group of from 1 to 20 carbon atoms; amino; alkylamino, dialkylamino, or alkoxy wherein the alkyl is from 1 to 20 carbon atoms, and $R^v$ is hydrogen or an alkyl group of the same value as in R'.

The anti-oxidants employed in accordance with the present invention are compounds obtained by hydrochloric acid catalyzed condensation of an alkyl mercaptan of from 1 to 22 carbon atoms, an alkylbenzyl mercaptan wherein the alkyl is from 1 to 22 carbon atoms, or an alkylated thiophenol wherein the alkyl is from 1 to 22 carbon atoms, with formaldehyde and an aromatic amine in accordance with the general procedure of G. F. Grillot and P. T. S. Lau, Jour. Org. Chem. 30, 28 (1965) and the references referred to therein.

As examples of alkyl mercaptans that are employed in the condensation reaction, the following are illustrative: methyl, ethyl, propyl, butyl, t-butyl, pentyl, hexyl, nonyl, n-decyl, dodecyl-, tridecyl-, tetradecyl-, octadecyl-, docosyl-mercaptan and the like. In lieu of such mercaptans, mercaptans obtained by the reaction of hydrogen sulfide with long chain α-olefins or polyolefins such as tetrapropylene, pentapropylene, hexapropylene, triisobutylene, tetraisobutoylene, mixed propene-butene and propeneisobutene polymers, 4,6,8-trimethyl-1-nonene; 5,7,7-trimethyl-1-octene; 2,4,6,6,8-pentamethyl-1-nonene; decene-1; dodecene-1; hexadecene-1 and octadecene-1 may also be employed.

As examples of alkylbenzyl mercaptans that are employed in the condensation reaction, the following are illustrative: benzyl, methylbenzyl, propylbenzyl, butylbenzyl, nonylbenzyl, decylbenzyl-, dodecylbenzyl-, tridecylbenzyl-, tetradecylbenzyl-, octadecylbenzyl-, nonadecylbenzyl- and docosylbenzylmercaptans, and the like.

The following are illustrative of the alkylated thiophenols that are employed in the condensation reaction: ethylthiophenol, nonylthiophenol, decylthiophenol, dodecylthiophenol, tridecylthiophenol, tetradecylthiophenol, octadecylthiophenol, nonodecylthiophenol and docosylthiophenol, and the like.

As illustrative aromatic amines that are employed in the condensation reaction, the following may be mentioned: aniline, N-methylaniline, N,N-dimethylaniline, diethylaniline, o-toluidine, o-phenylenediamine, N,N'-dimethyl-m-phenylenediamine, o-anisidine, diphenylamine, N-dodecylaniline, N-octadecylaniline, o,o'-dimethyldiphenylamine, o,o'-didodecyldiphenylamine, o,o'-dioctadecyldiphenylamine, and the like.

The anti-oxidants characterized by the foregoing formulae are employed in practically any type of organic material which is susceptible to oxidation such as, for example, rubber compositions comprising India rubber, balata, gutta percha; synthetic vulcanizable products, e.g., polychloroprene, olefin polysulfides, polybutadiene, butadiene-styrene copolymers such as buna-S, butadieneacrylonitrile copolymers such as buna-N and the like, whether or not the same have been admixed with the conventional fillers, pigment, curing agents and the like. The proportion of the anti-oxidant employed may range from 0.1% to 5% by weight and is mixed with rubber or rubber-like material in powder form or in solution in a suitable solvent such as, for example, acetone, dioxane, Cellosolve, etc., before vulcanization. Since these anti-oxidants have substantially no accelerating effect, there is no need for adjustment of vulcanizing conditions.

In addition to the foregoing natural and synthetic rubbers, the anti-oxidants may also be employed in various types of olefinic polymers such as, for example, poly(ethylene), poly(propylene), poly(butene-1), poly(pentene-1), poly(3-methylbutene-1), poly(hexene-1), poly(4-methylpentene-1), poly(4-methylpentene-1), poly(4-methylhexene-1), poly(4,4-dimethylpentene-1), and copolymers of these olefin monomers such as poly(ethylene copropylene), and the like.

The proportion of anti-oxidant employed in such polyolefins ranges from 0.05% to 5% by weight and mixed with the polyolefin in the same manner as described above.

The anti-oxidants may also be employed in any type of the drying oil compositions such as paints, enamels, varnishes, etc., as well as in drying oils such as linseed oil, tung oil, etc., used in their manufacture. Their action in quick drying compositions such as paints, varnishes, enamels, etc., is to prevent the breakdown of the drying oil film, which is due to brittleness caused by oxidation products or a peculiar gel structure which depends most likely upon the manner of cooking the resin and drying oil if the drying oil composition is a varnish or enamel. When employed as anti-oxidants in paints, varnishes and enamels, the quantity may range from 0.05 to 0.5% based on the non-volatile content of the paint, varnish or enamel composition.

The anti-oxidants prepared as above described mix very readily with any type of plastic material such as poly(styrene), poly(methyl styrene), poly(acrylates), poly(methyl acrylates), poly(ethyl acrylates), poly(2-ethylhexylacrylate), polycarbonates, polyesters such as polyethylene terephthalate, polyphenylene oxide, polysulfones, polyimides, polyamides, polybenzimidazoles, poly(acrylonitrile), poly(vinylchloride), poly(vinylacetate), poly(ethylene oxide), poly(methyl vinyl ether), etc. In such plastics the amount of anti-oxidant ranges from 0.05 to 5.0% based on the weight of the plastic material.

The anti-oxidants may also be employed in the stabilization of fats and oils in an amount ranging from 0.05 to 1.5% based on the weight of the oil such as, for example, menhaden oil, cod liver oil, safflower oil, castor oil, olive oil, sesame oil, peanut oil, babassu oil, palm oil, corn oil, lard, beef tallow and animal fat.

The anti-oxidants may also be employed in the stabilization of petroleum products such as cracked gasoline, jet fuel, diesel fuel, fuel oil and the like, lubricating oils containing olefinic bodies, in an amount ranging from 0.05 to 5% by weight of the fuel. The anti-oxidants are also excellent stabilizers for natural and synthetic lubricants, particularly alkyl oxalates, malonates, succinates, glutarates, adipates, pimelates, suberates, azelates, sebacates, esters from polyols such as pentaerythritol, trimethylol propane and sorbitol, alkyl esters of aliphatic monocarboxylic acids such as lauric, oleic, palmitic, stearic and behenic.

Other lubricants include silicone lubricants such as polysiloxane oils and greases of the type poly-alkyl-, polyaryl, polyalkoxy, polyaryloxy such as polydimethoxyphenoxy siloxane, silicate ester oils such as tetraalkyloxy and tetraaryloxy silanes, and halogen substituted siloxanes, in an amount ranging from 0.25 to 1 percent based on the weight of the lubricant or grease.

The anti-oxidants are also valuable for protecting polyfluorohydrocarbon lubricants, and polyalkyleneglycol lubricants such as ethylene oxide-propylene oxide copolymers, as well as synthetic base greases prepared by the mixing of soap and oil, including soaps derived from animals, vegetable fats, fatty acids, wool grease and petroleum acids, hydraulic fluids, transmission fluids, transformer oils, gear oils, glass annealing oils, etc.

The anti-oxidants prepared as above may readily be mixed with any type of organic material which is susceptible to oxidation. If the material is a liquid, the anti-oxidant may be dissolved in either amyl alcohol, acetone, Cellosolve, diethylcarbitol, dioxane, and the like. The selection of solvent or mixture of such solvents will depend upon its solubility in the liquid organic material. If the organic material is a solid such as rubber, plastics, soaps, fats and the like, the anti-oxidant is simply incorporated by either milling or mastication in powder form or, if desired, as a solution, and the solvent flashed off.

In order to illustrate how the aminobenzothioether anti-oxidants are prepared, the following examples are illustrative:

Example I

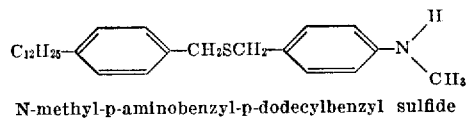

N-methyl-p-aminobenzyl-p-dodecylbenzyl sulfide

A mixture of 21.4 grams (0.2 mole) of N-methyl aniline in 17.2 ml. (0.2 mole) of concentrated hydrochloric acid was added over a 0.5 hr. period to 58.4 grams (0.2 mole) of p-dodecylbenzylmercaptan, and 15.2 ml. (0.2 mole) of 37% Formalin in 60 ml. of ethanol. The reaction mixture was refluxed (83°) for 0.5 hr., cooled and made basic by addition of 68 ml. of 10% sodium hydroxide. The mixture was washed with water and distilled, the maximum pot temperature was 180° at 1–2 mm. of Hg. The residue weighed 75.5 grams (92% of theory).

*Analysis.*—Calculated for $C_{27}H_{41}SN$: C, 79.02; H, 10.06; S, 7.80; SH, 0. Found: C, 77.77; H, 9.91; S, 8.98; SH, 0.3. The infrared exhibited bands at 3400, 1600 and 1500 cm.$^{-1}$.

Example II

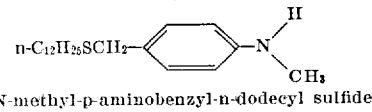

N-methyl-p-aminobenzyl-n-dodecyl sulfide

Prepared according to the procedure of Example I, employing 40.4 grams (0.2 mole) of 1-dodecanethiol, 15.2 ml. (0.2 mole) of 37% Formalin, 60.0 ml. of ethanol, 21.4 grams (0.2 mole) of N-methylaniline and 17.2 ml. (0.2 mole) of concentrated hydrochloric acid. Concentration yielded 64.0 grams of residue (91% of theory). Infrared—3420 cm.$^{-1}$, 1615, 1520, and 820 cm.$^{-1}$.

*Analysis.*—Calculated for $C_{20}H_{35}SN$: C, 74.70; H, 10.97; N, 4.36; S, 9.97; SH, 0. Found: C, 74.69; H, 11.23; N, 3.48; S, 10.06; SH, 0.3.

Example III

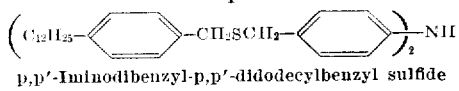

p,p'-Iminodibenzyl-p,p'-didodecylbenzyl sulfide

Prepared according to the method of Example I, employing 58.4 grams (0.2 mole) of dodecylbenzyl mercaptan, 15.2 ml. (0.2 mole) of Formalin (37%), 60 ml. of ethanol, 16.9 grams (0.1 mole) of diphenylamine and 17.2 ml. (0.2 mole) of hydrochloric acid. The yield was 77.8 grams (99% of theory); infrared: 3400, 1600, 1500, 1465, 1370, 1350, and 830 cm.$^{-1}$.

*Analysis.*—Calculated for $C_{52}H_{75}S_2N$: C, 80.25; H, 9.71; S, 8.24; N, 1.80. Found: C, 79.68; H, 9.94; S, 8.48; N, 1.61.

Example IV

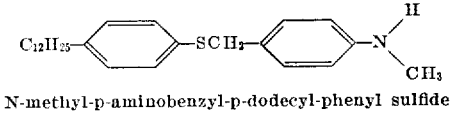

N-methyl-p-aminobenzyl-p-dodecyl-phenyl sulfide

Prepared according to the method of Example I, employing 55.6 grams (0.2 mole) of p-dodecylphenyl mercaptan, 15.2 ml. (0.2 mole) of Formalin (37%), 60 ml. of ethanol, 21.4 grams (0.2 mole) of N-methylaniline and 17.2 ml. (0.2 mole) of hydrochloric acid. The yield of product was 78 grams (95% of theory).

Example V

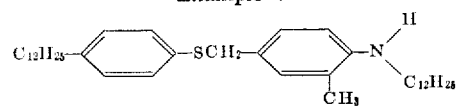

N-dodecyl-p-amino-o-methylbenzyl-p-dodecylphenyl sulfide

Prepared according to the procedure of Example I employing 55.6 grams (0.2 mole) of dodecylphenylmercaptan, 15.2 ml. (0.2 mole) of Formalin (37%) in 60 ml. of ethanol, 55.0 grams (0.2 mole) of N-dodecyl-o-toluidine and 17.2 ml. (0.2 mole) of concentrated hydrochloric acid, yielding 106 grams (94% of theory) of product.

Example VI

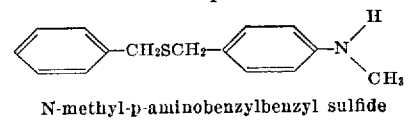

N-methyl-p-aminobenzylbenzyl sulfide

Prepared according to the method of Example I, employing 24.0 grams (0.2 mole) of benzylmercaptan, 15.2 ml. (0.2 mole) of Formalin (37%), 60 ml. of ethanol, 21.4 grams (0.2 mole) of N-methylaniline and 17.2 ml. (0.2 mole) of hydrochloric acid. The yield of product was 43.6 grams (90% of theory).

Example VII

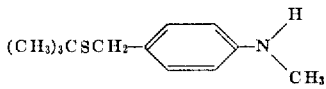

Prepared according to the method of Example I, employing 18.0 grams (0.2 mole) of t-butylmercaptan, 15.2 ml. (0.2 mole) of Formalin (37%), 60 ml. of ethanol, 21.4 grams (0.2 mole) of N-methylaniline and 17.2 ml. (0.2 mole) of hydrochloric acid. The yield of product was 33 grams (80% of theory).

The anti-oxidants prepared as above described are uniquely adaptable for protection of lubricating oils. To determine their efficiency, the anti-oxidants were subjected to the Rotary Bomb Oxidation Test as described in ASTM—D 2272–64T. In this test, 50 grams of test oil (containing anti-oxidant), 5 ml. of distilled water and 10 ft. of No. AWG electrolytic copper wire wound in a coil with an outside diameter of 50 to 52 mm. were placed in a glass container. The glass container was then inserted in a chrome-plated copper bomb and covered with a watch glass. Distilled water (5 ml.) was also added to the bomb to aid heat transfer when the bomb was placed in the heating bath. The bomb was then closed and sealed. A pressure gauge was then attached and the bomb was charged with oxygen to 90 p.s.i.g. and allowed to stand for 10 minutes to check for any leaks. The bomb was then placed on a rotating stand in a heating bath, kept at 150° C. The bomb was tilted to 30° from the horizontal and rotated at 100 r.p.m. Within 10 to 15 minutes the contents of the bomb attained the temperature of the bath and the pressure in the bomb increased from 90 p.s.i.g. to about 180 to 190 p.s.i.g. due to expansion of oxygen. The pressure of the bomb remained at this level for a certain time, the length of the time depending on the effectiveness of the oxidation inhibitor in the test oil formulation, and then started to drop. The period from the time when the maximum pressure was attained to the time when the pressure has dropped by 25 p.s.i.g. from the maximum pressure, is reported as induction period and serves as a measure for the effectiveness of the oxidation inhibitor.

The oil used for this test was a solvent refined paraffinic oil having the following properties: gravity—°API: 32.2; kinematic visc. cst. at 100° F., 103; 210° F., 39.5; VI, 95; pour point, −10° F.; flash point, 380° F.; color ASTM, 0.5; fire point, 430° F.; neutralization value, nil; Cu corrosion/212° F., negative.

The results obtained, by comparison with a commercial standard, are shown in Table I:

TABLE I.—ROTARY BOMB OXIDATION TEST

| Anti-oxidant | Concentration, percent | Induction time (minutes) |
|---|---|---|
| Product of Example I | 0.50 | 270 |
|  | 0.25 | 135 |
|  | 0.05 | 40 |
| Product of Example II | 1.0 | 210 |
|  | 0.50 | 195 |
|  | 0.25 | 115 |
| Product of Example III | 0.25 | 220 |
|  | 0.10 | 168 |
| Product of Example IV | 0.25 | 140 |
| Product of Example V | 0.25 | 135 |
| Commercial standard: (2,6-di-t-butyl-4-methylphenol) | 0.50 | 195 |
|  | 0.25 | 125 |

To illustrate the antioxidant effect of the products of this invention in protecting polypropylene, the standard oven oxidation test was used.

The antioxidant system is compounded into unstabilized polypropylene on a Banbury type laboratory mill (Brabender Plastograph) at 183° C. for 10 minutes. A 40 mil thick sheet of compounded material is compression molded on a laboratory press (Carver) using 245° C. platen temperatures, 10,000 lbs. pressure on the 2¼ in. diameter ram, and a dwell time of 2 minutes. The sheets are air cooled under pressure before removal from the press. Standard microdumbell specimens (ASTM D1708–59T) are die cut from the sheet. The specimens are suspended vertically in an air circulating oven operating at 300° F. Time to initial failure is noted as exposure time required for first signs of micro-cracking or crazing of specimen. Time to final failure is noted as the exposure time required to produce breaking of the specimen when flicked with the finger.

The products were evaluated as antioxidants for polypropylene by the preceding procedure. They were tested alone at 0.5 part per 100 parts of polypropylene. The results shown in Table II clearly demonstrate antioxidant effects:

TABLE II.—POLYPROPYLENE OVEN TEST

| Antioxidant | Percent concentration | Time to failure (hrs.) |
|---|---|---|
| Product of Example I | 0.5 | 131–152 |
| Product of Example II | 0.5 | 71–125 |
| Product of Example III | 0.5 | 276–316 |
| Commercial Standard: 2,6-di-t-butyl-4-methylphenol | 0.5 | 9 |

I claim:

1. An organic composition which tends to deteriorate by the absorption of oxygen from the air, containing an antioxidizing amount of an aminobenzyl thioether in the range of 0.05 to 5.0% by weight selected from the class consisting of those corresponding to the following formulae:

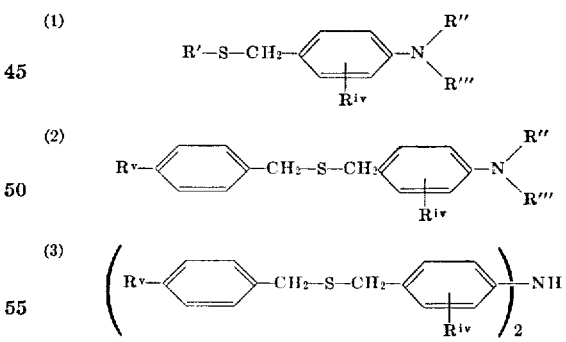

wherein R' is selected from the group consisting of alkyl of from 1 to 22 carbon atoms, phenyl, and phenyl substituted by an alkyl group of from 1 to 22 carbon atoms, R'' and R''' are selected from the group consisting of hydrogen and alkyl of from 1 to 20 carbon atoms, $R^{iv}$ is selected from the group consisting of hydrogen, alkyl of from 1 to 20 carbon atoms, amino, alkylamino, dialkylamino, and alkoxy, and $R^v$ is selected from the group consisting of hydrogen and alkyl of from 1 to 22 carbon atoms.

2. An organic composition according to claim 1 wherein the aminobenzyl thioether has the formula:

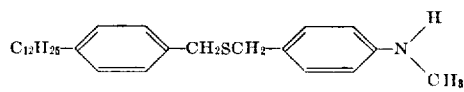

3. An organic composition according to claim 1 wherein the aminobenzyl thioether has the formula:

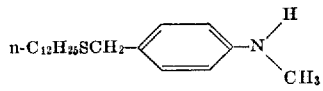

4. An organic composition according to claim 1 wherein the aminobenzyl thioether has the formula:

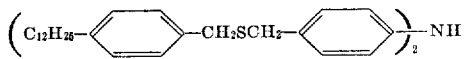

5. An organic composition according to claim 1 wherein the aminobenzyl thioether has the formula:

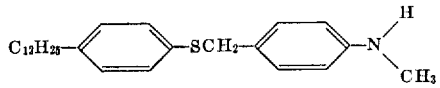

6. An organic composition according to claim 1 wherein the aminobenzyl thioether has the formula:

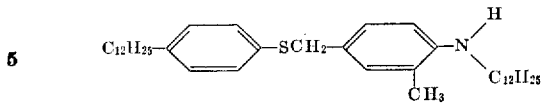

References Cited
UNITED STATES PATENTS

| | | | |
|---|---|---|---|
| 3,156,728 | 11/1964 | Orloff et al. | 252—402 X |
| 3,175,992 | 3/1965 | Anderson | 260—45.9 X |
| 3,293,321 | 12/1966 | Layor | 260—45.9 X |

LEON D. ROSDOL, *Primary Examiner.*

I. GLUCK, *Assistant Examiner.*

U.S. Cl. X.R.

260—30.8, 45.9